(12) United States Patent
Bataineh et al.

(10) Patent No.: US 12,443,546 B2
(45) Date of Patent: Oct. 14, 2025

(54) SYSTEM AND METHOD FOR FACILITATING DATA REQUEST MANAGEMENT IN A NETWORK INTERFACE CONTROLLER (NIC)

(71) Applicant: Hewlett Packard Enterprise Development LP, Houston, TX (US)

(72) Inventors: Abdulla M. Bataineh, Vista, CA (US); Thomas Court, Three Lakes, WI (US); David Charles Hewson, Bristol (GB); Timothy J. Johnson, Madison, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 140 days.

(21) Appl. No.: 17/594,820

(22) PCT Filed: Mar. 23, 2020

(86) PCT No.: PCT/US2020/024254
§ 371 (c)(1),
(2) Date: Oct. 29, 2021

(87) PCT Pub. No.: WO2020/236278
PCT Pub. Date: Nov. 26, 2020

(65) Prior Publication Data
US 2022/0231962 A1    Jul. 21, 2022

Related U.S. Application Data (60) Provisional application No. 62/852,289, filed on May 23, 2019, provisional application No. 62/852,203, (Continued)

(51) Int. Cl.
*G06F 13/16*     (2006.01)
*G06F 9/50*      (2006.01)
(Continued)

(52) U.S. Cl.
CPC .......... *G06F 13/1642* (2013.01); *G06F 9/505* (2013.01); *G06F 9/546* (2013.01);
(Continued)

(58) Field of Classification Search
None
See application file for complete search history.

(56) References Cited

U.S. PATENT DOCUMENTS

| | | |
|---|---|---|
| 4,807,118 A | 2/1989 | Lin et al. |
| 5,138,615 A | 8/1992 | Lamport et al. |

(Continued)

FOREIGN PATENT DOCUMENTS

| | | |
|---|---|---|
| CN | 101729609 A | 6/2010 |
| CN | 102932203 A | 2/2013 |

(Continued)

OTHER PUBLICATIONS

International Search Report and Written Opinion received for PCT Application No. PCT/US2020/024254, mailed on Jul. 13, 2020, 10 pages.

(Continued)

*Primary Examiner* — Chirag G Shah
*Assistant Examiner* — Suk Jin Kang
(74) *Attorney, Agent, or Firm* — Dickinson Wright (57) ABSTRACT

A network interface controller (NIC) capable of facilitating efficient data request management is provided. The NIC can be equipped with a command queue, a message chopping unit (MCU), and a traffic management logic block. During operation, the command queue can store a command issued via a host interface. The MCU can then determine a type of the command and a length of a response of the command. If the command is a data request, the traffic management logic block can determine whether the length of the response is within a threshold. If the length exceeds the threshold, the (Continued)

traffic management logic block can pace the command such that the response is within the threshold.

25 Claims, 7 Drawing Sheets

Related U.S. Application Data filed on May 23, 2019, provisional application No. 62/852,273, filed on May 23, 2019.

(51) Int. Cl.

| | |
|---|---|
| *G06F 9/54* | (2006.01) |
| *G06F 12/0862* | (2016.01) |
| *G06F 12/1036* | (2016.01) |
| *G06F 12/1045* | (2016.01) |
| *G06F 13/14* | (2006.01) |
| *G06F 13/28* | (2006.01) |
| *G06F 13/38* | (2006.01) |
| *G06F 13/40* | (2006.01) |
| *G06F 13/42* | (2006.01) |
| *G06F 15/173* | (2006.01) |
| *H04L 1/00* | (2006.01) |
| *H04L 43/0876* | (2022.01) |
| *H04L 43/10* | (2022.01) |
| *H04L 45/00* | (2022.01) |
| *H04L 45/02* | (2022.01) |
| *H04L 45/021* | (2022.01) |
| *H04L 45/028* | (2022.01) |
| *H04L 45/12* | (2022.01) |
| *H04L 45/122* | (2022.01) |
| *H04L 45/125* | (2022.01) |
| *H04L 45/16* | (2022.01) |
| *H04L 45/24* | (2022.01) |
| *H04L 45/42* | (2022.01) |
| *H04L 45/745* | (2022.01) |
| *H04L 47/10* | (2022.01) |
| *H04L 47/11* | (2022.01) |
| *H04L 47/12* | (2022.01) |
| *H04L 47/122* | (2022.01) |
| *H04L 47/20* | (2022.01) |
| *H04L 47/22* | (2022.01) |
| *H04L 47/24* | (2022.01) |
| *H04L 47/2441* | (2022.01) |
| *H04L 47/2466* | (2022.01) |
| *H04L 47/2483* | (2022.01) |
| *H04L 47/30* | (2022.01) |
| *H04L 47/32* | (2022.01) |
| *H04L 47/34* | (2022.01) |
| *H04L 47/52* | (2022.01) |
| *H04L 47/62* | (2022.01) |
| *H04L 47/625* | (2022.01) |
| *H04L 47/6275* | (2022.01) |
| *H04L 47/629* | (2022.01) |
| *H04L 47/76* | (2022.01) |
| *H04L 47/762* | (2022.01) |
| *H04L 47/78* | (2022.01) |
| *H04L 47/80* | (2022.01) |
| *H04L 49/00* | (2022.01) |
| *H04L 49/101* | (2022.01) |
| *H04L 49/15* | (2022.01) |
| *H04L 49/90* | (2022.01) |
| *H04L 49/9005* | (2022.01) |
| *H04L 49/9047* | (2022.01) |
| *H04L 67/1097* | (2022.01) |
| *H04L 69/22* | (2022.01) |
| *H04L 69/40* | (2022.01) |
| *H04L 45/28* | (2022.01) |
| *H04L 45/7453* | (2022.01) |
| *H04L 69/28* | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1673* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |

(56) References Cited

U.S. PATENT DOCUMENTS

| | | |
|---|---|---|
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweya et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | Mccanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,684,461 B1 * | 6/2017 | Dodson .............. G06F 13/1668 |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | Mckelvie et al. |
| 10,169,060 B1 | 1/2019 | Vincent et al. |
| 10,175,891 B1 * | 1/2019 | Malwankar .......... G06F 3/0611 |
| 10,178,035 B2 | 1/2019 | Dillon |
| 10,180,792 B1 * | 1/2019 | Gaertner ............. G06F 11/1441 |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,282,103 B1 * | 5/2019 | Stone .................... G06F 13/24 |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 * | 10/2003 | Futral .................. G06F 13/385 |
| | | 710/23 |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 * | 7/2005 | Simpson, III ......... G06F 13/385 |
| | | 370/235 |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 * | 9/2006 | Kwan .................... H04L 47/193 |
| | | 370/235 |
| 2007/0061433 A1 | 3/2007 | Reynolds et al. |
| 2007/0070901 A1 * | 3/2007 | Aloni .................... H04L 47/10 |
| | | 370/392 |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |

(56) References Cited

U.S. PATENT DOCUMENTS

| | | | |
|---|---|---|---|
| 2008/0117816 A1* | 5/2008 | Stone | H04L 43/16 370/230.1 |
| 2008/0147881 A1 | 6/2008 | Krishnamurthy et al. | |
| 2008/0159138 A1 | 7/2008 | Shepherd et al. | |
| 2008/0253289 A1 | 10/2008 | Naven et al. | |
| 2009/0003212 A1 | 1/2009 | Kwan et al. | |
| 2009/0010157 A1 | 1/2009 | Holmes et al. | |
| 2009/0013175 A1 | 1/2009 | Elliott | |
| 2009/0055496 A1 | 2/2009 | Garg et al. | |
| 2009/0092046 A1 | 4/2009 | Naven et al. | |
| 2009/0132760 A1* | 5/2009 | Flynn | G06F 3/0619 711/E12.019 |
| 2009/0141621 A1 | 6/2009 | Fan et al. | |
| 2009/0157919 A1* | 6/2009 | Dodson | G06F 13/4022 710/57 |
| 2009/0198958 A1 | 8/2009 | Arimilli et al. | |
| 2009/0259713 A1 | 10/2009 | Blumrich et al. | |
| 2009/0285222 A1 | 11/2009 | Hoover et al. | |
| 2010/0061241 A1 | 3/2010 | Sindhu et al. | |
| 2010/0161750 A1* | 6/2010 | Pandya | H04L 69/32 709/212 |
| 2010/0169608 A1 | 7/2010 | Kuo et al. | |
| 2010/0172260 A1* | 7/2010 | Kwan | H04L 47/193 370/252 |
| 2010/0183024 A1 | 7/2010 | Gupta | |
| 2010/0220595 A1 | 9/2010 | Petersen | |
| 2010/0274876 A1 | 10/2010 | Kagan et al. | |
| 2010/0302942 A1 | 12/2010 | Shankar et al. | |
| 2010/0316053 A1 | 12/2010 | Miyoshi et al. | |
| 2011/0051724 A1 | 3/2011 | Scott et al. | |
| 2011/0066824 A1 | 3/2011 | Bestler | |
| 2011/0072179 A1 | 3/2011 | Lacroute et al. | |
| 2011/0099326 A1 | 4/2011 | Jung et al. | |
| 2011/0110383 A1 | 5/2011 | Yang et al. | |
| 2011/0128959 A1 | 6/2011 | Bando et al. | |
| 2011/0158096 A1 | 6/2011 | Leung et al. | |
| 2011/0158248 A1 | 6/2011 | Vorunganti et al. | |
| 2011/0164496 A1 | 7/2011 | Loh et al. | |
| 2011/0173370 A1 | 7/2011 | Jacobs et al. | |
| 2011/0264822 A1 | 10/2011 | Ferguson et al. | |
| 2011/0276699 A1 | 11/2011 | Pedersen | |
| 2011/0280125 A1 | 11/2011 | Jayakumar | |
| 2011/0320724 A1 | 12/2011 | Mejdrich et al. | |
| 2012/0093505 A1 | 4/2012 | Yeap et al. | |
| 2012/0102506 A1 | 4/2012 | Hopmann et al. | |
| 2012/0117423 A1 | 5/2012 | Andrade et al. | |
| 2012/0137075 A1 | 5/2012 | Vorbach | |
| 2012/0144064 A1 | 6/2012 | Parker et al. | |
| 2012/0144065 A1 | 6/2012 | Parker et al. | |
| 2012/0147752 A1 | 6/2012 | Ashwood-Smith et al. | |
| 2012/0170462 A1 | 7/2012 | Sinha | |
| 2012/0170575 A1 | 7/2012 | Mehra | |
| 2012/0213118 A1 | 8/2012 | Lindsay et al. | |
| 2012/0250512 A1 | 10/2012 | Jagadeeswaran et al. | |
| 2012/0287821 A1 | 11/2012 | Godfrey et al. | |
| 2012/0297083 A1 | 11/2012 | Ferguson et al. | |
| 2012/0300669 A1 | 11/2012 | Zahavi | |
| 2012/0314707 A1 | 12/2012 | Epps et al. | |
| 2013/0010636 A1 | 1/2013 | Regula | |
| 2013/0039169 A1 | 2/2013 | Schlansker et al. | |
| 2013/0060944 A1 | 3/2013 | Archer et al. | |
| 2013/0103777 A1 | 4/2013 | Kagan et al. | |
| 2013/0121178 A1 | 5/2013 | Mainaud et al. | |
| 2013/0136090 A1 | 5/2013 | Liu et al. | |
| 2013/0182704 A1 | 7/2013 | Jacobs et al. | |
| 2013/0194927 A1 | 8/2013 | Yamaguchi et al. | |
| 2013/0203422 A1 | 8/2013 | Masputra et al. | |
| 2013/0205002 A1 | 8/2013 | Wang et al. | |
| 2013/0208593 A1 | 8/2013 | Nandagopal | |
| 2013/0246552 A1 | 9/2013 | Underwood et al. | |
| 2013/0290673 A1 | 10/2013 | Archer et al. | |
| 2013/0301645 A1 | 11/2013 | Bogdanski et al. | |
| 2013/0304988 A1 | 11/2013 | Totolos et al. | |
| 2013/0311525 A1 | 11/2013 | Neerincx et al. | |
| 2013/0329577 A1 | 12/2013 | Suzuki et al. | |
| 2013/0336164 A1 | 12/2013 | Yang et al. | |
| 2014/0019661 A1 | 1/2014 | Hormuth et al. | |
| 2014/0032695 A1 | 1/2014 | Michels et al. | |
| 2014/0036680 A1 | 2/2014 | Lih et al. | |
| 2014/0064082 A1 | 3/2014 | Yeung et al. | |
| 2014/0095753 A1 | 4/2014 | Crupnicoff et al. | |
| 2014/0098675 A1 | 4/2014 | Frost et al. | |
| 2014/0119367 A1 | 5/2014 | Han et al. | |
| 2014/0122560 A1 | 5/2014 | Ramey et al. | |
| 2014/0129664 A1* | 5/2014 | McDaniel | G06F 13/28 709/212 |
| 2014/0133292 A1 | 5/2014 | Yamatsu et al. | |
| 2014/0136646 A1 | 5/2014 | Tamir et al. | |
| 2014/0169173 A1 | 6/2014 | Naouri et al. | |
| 2014/0185621 A1 | 7/2014 | Decusatis et al. | |
| 2014/0189174 A1 | 7/2014 | Ajanovic et al. | |
| 2014/0207881 A1 | 7/2014 | Nussle et al. | |
| 2014/0211804 A1 | 7/2014 | Makikeni et al. | |
| 2014/0226488 A1 | 8/2014 | Shamis et al. | |
| 2014/0241164 A1 | 8/2014 | Cociglio et al. | |
| 2014/0258438 A1* | 9/2014 | Ayoub | G06F 13/28 709/212 |
| 2014/0301390 A1 | 10/2014 | Scott et al. | |
| 2014/0307554 A1 | 10/2014 | Basso et al. | |
| 2014/0325013 A1* | 10/2014 | Tamir | G06F 21/79 709/212 |
| 2014/0328172 A1 | 11/2014 | Kumar et al. | |
| 2014/0344488 A1* | 11/2014 | Flynn | G06F 13/1673 710/52 |
| 2014/0347997 A1 | 11/2014 | Bergamasco et al. | |
| 2014/0362698 A1 | 12/2014 | Arad | |
| 2014/0369360 A1 | 12/2014 | Carlstrom | |
| 2014/0379847 A1 | 12/2014 | Williams | |
| 2015/0003247 A1 | 1/2015 | Mejia et al. | |
| 2015/0006849 A1 | 1/2015 | Xu et al. | |
| 2015/0009823 A1 | 1/2015 | Ganga et al. | |
| 2015/0026361 A1 | 1/2015 | Matthews et al. | |
| 2015/0029848 A1 | 1/2015 | Jain | |
| 2015/0055476 A1 | 2/2015 | Decusatis et al. | |
| 2015/0055661 A1 | 2/2015 | Boucher et al. | |
| 2015/0067095 A1 | 3/2015 | Gopal et al. | |
| 2015/0089495 A1 | 3/2015 | Persson et al. | |
| 2015/0103667 A1 | 4/2015 | Elias et al. | |
| 2015/0124826 A1 | 5/2015 | Edsall et al. | |
| 2015/0146527 A1 | 5/2015 | Kishore et al. | |
| 2015/0154004 A1* | 6/2015 | Aggarwal | G06F 5/065 710/22 |
| 2015/0161064 A1 | 6/2015 | Pope | |
| 2015/0180782 A1 | 6/2015 | Rimmer et al. | |
| 2015/0186318 A1 | 7/2015 | Kim et al. | |
| 2015/0193262 A1 | 7/2015 | Archer et al. | |
| 2015/0195388 A1 | 7/2015 | Snyder et al. | |
| 2015/0208145 A1 | 7/2015 | Parker et al. | |
| 2015/0220449 A1 | 8/2015 | Stark et al. | |
| 2015/0234776 A1* | 8/2015 | Tamir | G06F 13/385 709/212 |
| 2015/0237180 A1 | 8/2015 | Swartzentruber et al. | |
| 2015/0244617 A1 | 8/2015 | Nakil et al. | |
| 2015/0244804 A1 | 8/2015 | Warfield et al. | |
| 2015/0261434 A1* | 9/2015 | Kagan | G06F 13/28 711/103 |
| 2015/0263955 A1 | 9/2015 | Talaski et al. | |
| 2015/0263994 A1 | 9/2015 | Haramaty et al. | |
| 2015/0288626 A1 | 10/2015 | Aybay | |
| 2015/0365337 A1 | 12/2015 | Pannell | |
| 2015/0370586 A1 | 12/2015 | Cooper et al. | |
| 2016/0006664 A1 | 1/2016 | Sabato et al. | |
| 2016/0006805 A1* | 1/2016 | Ulupinar | H04L 67/02 709/217 |
| 2016/0012002 A1 | 1/2016 | Arimilli et al. | |
| 2016/0028613 A1 | 1/2016 | Haramaty et al. | |
| 2016/0065455 A1 | 3/2016 | Wang et al. | |
| 2016/0094450 A1 | 3/2016 | Ghanwani et al. | |
| 2016/0134518 A1 | 5/2016 | Callon et al. | |
| 2016/0134535 A1 | 5/2016 | Callon | |
| 2016/0134559 A1 | 5/2016 | Abel et al. | |
| 2016/0134573 A1 | 5/2016 | Gagliardi et al. | |

(56) References Cited

U.S. PATENT DOCUMENTS

| | | |
|---|---|---|
| 2016/0142318 A1 | 5/2016 | Beecroft |
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1* | 6/2017 | Berman ............... G06F 3/0656 |
| 2017/0220500 A1* | 8/2017 | Tong ................... G06F 13/36 |
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | Mckelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0107627 A1* | 4/2018 | LeBeane ............ H04L 49/9063 |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219741 A1* | 8/2018 | Thompson ............. H04L 67/01 |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278533 A1* | 9/2018 | Li ....................... H04L 47/2441 |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2018/0356996 A1* | 12/2018 | Benisty ............... G06F 3/0653 |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1* | 2/2019 | Ganapathi ............... H04L 45/02 |
| 2019/0044863 A1 | 2/2019 | Mula et al. |
| 2019/0044872 A1 | 2/2019 | Ganapathi et al. |
| 2019/0044875 A1* | 2/2019 | Murty .................... H04L 45/24 |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1* | 3/2019 | Kobayashi ......... H04L 47/6275 |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1* | 6/2019 | Shahar ................ G06F 15/1735 |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0278739 A1* | 9/2019 | Tamir .................. G06F 13/4282 |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0014778 A1* | 1/2020 | Mangin .................. H04L 47/50 |
| 2020/0036644 A1 | 1/2020 | Belogolovy et al. |
| 2020/0084150 A1* | 3/2020 | Burstein ............... H04L 47/805 |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334077 A1* | 10/2020 | Baldocchi ............. G06F 9/4881 |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0100696 A1* | 3/2022 | Tamir ................ G06F 15/17331 |
| 2022/0131768 A1* | 4/2022 | Ganapathi ........... H04L 43/0811 |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |

(56) References Cited

FOREIGN PATENT DOCUMENTS

| | | |
|---|---|---|
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

OTHER PUBLICATIONS

Ramakrishnan et al, RFC 3168, "The addition of Explicit Congestion Notification (ECN) to IP", Sep. 2001 (Year: 2001).
Awerbuch, B., et al.; "An On-Demand Secure Routing Protocol Resilient to Byzantine Failures"; Sep., 2002; 10 pages.
Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.
Bhatele, A., et al.; "Analyzing Network Health and Congestion in Dragonfly-based Supercomputers"; May 23-27, 2016; 10 pages.
Blumrich, M.A., et al.; "Exploiting Idle Resources in a High-Radix Switch for Supplemental Storage"; Nov. 2018; 13 pages.
Chang, F., et al.; "PVW: Designing Vir PVW: Designing Virtual World Ser orld Server Infr er Infrastructur astructure"; 2010; 8 pages.
Chang, F., et al.; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer;—ping"; https://www.cisco.com/c/en/US/td/docs/security/asa/asa-command-reference/1-R/cmdref2/p1.html; 2017.
Cisco; "Understanding Rapid Spanning Tree Protocol (802.1w)"; Aug. 1, 2017; 13 pages.
Eardley, ED, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network For Data Centers"; Nov. 7, 2017; 15 pages.
International Search Report and Written Opinion received for PCT Application No. PCT/US2020/024248, mailed on Jul. 8, 2020, 11 pages.
International Search Report and Written Opinion received for PCT Application No. PCT/US20/024332, mailed on Jul. 8, 2020, 13 pages.
International Search Report and Written Opinion received for PCT Application No. PCT/US20/24243, mailed on July 9. 2020, 10 pages.
International Search Report and Written Opinion received for PCT Application No. PCT/US20/24253, mailed on July 6. 2020, 12 pages.
International Search Report and Written Opinion received for PCT Application No. PCT/US20/24256, mailed on Jul. 7, 2020, 11 pages.
International Search Report and Written Opinion received for PCT Application No. PCT/US20/24257, mailed on July 7. 2020, 10 pages.
International Search Report and Written Opinion received for PCT Application No. PCT/US20/24258, mailed on July 7. 2020, 9 pages.
International Search Report and Written Opinion received for PCT Application No. PCT/US20/24259, mailed on July 9. 2020, 13 pages.
International Search Report and Written Opinion received for PCT Application No. PCT/US20/24260, mailed on July 7. 2020, 11 pages.
International Search Report and Written Opinion received for PCT Application No. PCT/US20/24268, mailed on July 9. 2020, 11 pages.
International Search Report and Written Opinion received for PCT Application No. PCT/US20/24269, mailed on Jul. 9, 2020, 11 pages.
International Search Report and Written Opinion received for PCT Application No. PCT/US20/24339, mailed on Jul. 8, 2020, 11 pages.
International Search Report and Written Opinion received for PCT Application No. PCT/US2020/024125, mailed on Jul. 10, 2020, 5 pages.
International Search Report and Written Opinion received for PCT Application No. PCT/US2020/024129, mailed on Jul. 10, 2020, 11 pages.
International Search Report and Written Opinion received for PCT Application No. PCT/US2020/024237, mailed on Jul. 14, 2020, 5 pages.
International Search Report and Written Opinion received for PCT Application No. PCT/US2020/024239, mailed on Jul. 14, 2020, 11 pages.
International Search Report and Written Opinion received for PCT Application No. PCT/US2020/024241, mailed on Jul. 14, 2020, 13 pages.
International Search Report and Written Opinion received for PCT Application No. PCT/US2020/024242, mailed on Jul. 6, 2020, 11 pages.
International Search Report and Written Opinion received for PCT Application No. PCT/US2020/024244, mailed on Jul. 13, 2020, 10 pages.
International Search Report and Written Opinion received for PCT Application No. PCT/US2020/024245, mailed on Jul. 14, 2020, 11 pages.
International Search Report and Written Opinion received for PCT Application No. PCT/US2020/024246, mailed on Jul. 14, 2020, 10 pages.
International Search Report and Written Opinion received for PCT Application No. PCT/US2020/024250, mailed on Jul. 14, 2020, 12 pages.
International Search Report and Written Opinion received for PCT Application No. PCT/US2020/024262, mailed on Jul. 13, 2020, 10 pages.
International Search Report and Written Opinion received for PCT Application No. PCT/US2020/024266, mailed on Jul. 9, 2020, 10 pages.
International Search Report and Written Opinion received for PCT Application No. PCT/US2020/024270, mailed on Jul. 10, 2020, 13 pages.
International Search Report and Written Opinion received for PCT Application No. PCT/US2020/024271, mailed on Jul. 9, 2020, 10 pages.
International Search Report and Written Opinion received for PCT Application No. PCT/US2020/024272, mailed on Jul. 9, 2020, 10 pages.
International Search Report and Written Opinion received for PCT Application No. PCT/US2020/024276, mailed on Jul. 13, 2020, 9 pages.

(56) References Cited

OTHER PUBLICATIONS

International Search Report and Written Opinion received for PCT Application No. PCT/US2020/024304, mailed on Jul. 15, 2020, 11 pages.
International Search Report and Written Opinion received for PCT Application No. PCT/US2020/024311, mailed on Jul. 17, 2020, 8 pages.
International Search Report and Written Opinion received for PCT Application No. PCT/US2020/024321, mailed on Jul. 9, 2020, 9 pages.
International Search Report and Written Opinion received for PCT Application No. PCT/US2020/024324, mailed on Jul. 14, 2020, 10 pages.
International Search Report and Written Opinion received for PCT Application No. PCT/US2020/024327, mailed on Jul. 10, 2020, 15 pages.
International Search Report and Written Opinion received for PCT Application No. PCT/US2020/24158, mailed on Jul. 6, 2020, 18 pages.
International Search Report and Written Opinion received for PCT Application No. PCT/US2020/24251, mailed on Jul. 6, 2020, 11 pages.
International Search Report and Written Opinion received for PCT Application No. PCT/US2020/24267, mailed on Jul. 6, 2020, 9 pages.
International Search Report and Written Opinion received for PCT Patent Application No. PCT/US20/24303, mailed on Oct. 21, 2020, 9 pages.
International Search Report and Written Opinion received for PCT Patent Application No. PCT/US20/24340, mailed on Oct. 26, 2020, 9 pages.
International Search Report and Written Opinion received for PCT Patent Application No. PCT/US20/24342, mailed on Oct. 27, 2020, 10 pages.
International Search Report and Written Opinion received for PCT Patent Application No. PCT/US2020/024192, mailed on Oct. 23, 2020, 9 pages.
International Search Report and Written Opinion received for PCT Patent Application No. PCT/US2020/024221, mailed on Oct. 26, 2020, 9 pages.
International Search Report cited in PCT/US2020/024170 mailed Dec. 16, 2020; 3 pages.

Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sep. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al.; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al.; "Deadlock-Free Broadcast Routing in Dragonfly Networks without Virtual Channels", submission to IEEE transactions on Parallel and Distributed Systems, 2015, 15 pages.
Extended European Search Report and Search Opinion received for EP Application No. 20809930.9, mailed on Mar. 2, 2023, 9 pages.
Extended European Search Report and Search Opinion received for EP Application No. 20810784.7, mailed on Mar. 9, 2023, 7 pages.

* cited by examiner

SYSTEM AND METHOD FOR FACILITATING DATA REQUEST MANAGEMENT IN A NETWORK INTERFACE CONTROLLER (NIC)

CROSS REFERENCE TO RELATED APPLICATIONS

This application is a 371 National Stage Entry of PCT/US2020/024254, filed on Mar. 23, 2020, which claims the benefit of and priority to U.S. Provisional Patent Application No. 62/852,203, filed on May 23, 2019; U.S. Provisional Patent Application No. 62/852,273, filed on May 23, 2019; and U.S. Provisional Patent Application No. 62/852,289, filed on May 23, 2019; the contents of which are incorporated herein by reference in their entirety.

BACKGROUND

Field

This is generally related to the technical field of networking. More specifically, this disclosure is related to systems and methods for facilitating a network interface controller (NIC) with efficient data request management.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (JOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of facilitating efficient data request management is provided. The NIC can be equipped with a command queue, a message chopping unit (MCU), and a traffic management logic block. During operation, the command queue can store a command issued via a host interface. The MCU can then determine a type of the command and generate a set of requesting packets from the command. For a respective requesting packet, the MCU can determine a length of a response (e.g., a response packet) of the requesting packet. If the command is a data request, the traffic management logic block can determine whether the length of the response is within a threshold. If the length exceeds the threshold, the traffic management logic block can pace the command such that the response is within the threshold.

BRIEF DESCRIPTION OF THE FIGURES

In the figures, like reference numerals refer to the same figure elements.

DETAILED DESCRIPTION

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient data request management in a network interface controller (NIC). The NIC allows a host to communicate with a data-driven network.

The embodiments described herein solve the problem of network congestion caused by disparity in respective sizes of data requests and responses by (i) identifying a data request in a NIC and determining the size of a corresponding response, and (ii) throttling the rate of requests at the NIC, if needed, to limit the rate of corresponding responses within a threshold.

During operation, a user process, which may run on an initiator computing device, can generate a data request (e.g., a "GET" command of remote direct memory access (RDMA)) and insert the request into a command queue of the NIC. The process can notify the NIC regarding the insertion, for example, by updating a write pointer. The NIC can fetch the request and initiate forwarding of the request (e.g., in a message or packet). However, the NIC may process and forward requests at a rate that is higher than the rate at which corresponding responses are returned. For example, a request can be relatively small in size (e.g., 48 bytes long) while the corresponding response can be significantly larger in size (e.g., 2048 bytes long).

As a result, the request may require 1 clock cycle of the NIC to issue but the response message may require 50 clock cycles of the NIC to write the response data into the memory of the host device of the NIC. Consequently, there may be a 1:50 disparity in the sizes and processing time between the request and the corresponding response. If the NIC continues to issue a request in every clock cycle, when the responses come back, due to their significantly larger size, there can be congestion in the network. In particular, if the NIC continues to receive a large quantity of data, the corresponding backpressure can lead to significant congestion in the network. The larger the responses, the more congested the input queues can become.

To solve this problem, the NIC can be equipped with a request management system that can inspect a respective command obtained from the command queue to determine whether the command is a data request. If the command is a data request (e.g., a GET command), the NIC can determine the size of the corresponding response based on the quantity of data requested. The NIC can then determine the potential incoming data rate that can be generated by the response. Subsequently, the NIC determines whether the potential incoming data rate is within a threshold. In some embodiments, the threshold can be set based on the rate at which the NIC can absorb the responses. In this way, the rate at which requests are allowed to be issued is controlled by the NIC so that the rate matches the bandwidth at which the NIC can absorb the responses.

One embodiment of the present invention provides NIC. The NIC can be equipped with a command queue, a message chopping unit (MCU), and a traffic management logic block. During operation, the command queue stores a command issued via a host interface. The MCU can then determine a type of the command and generate a set of requesting packets from the command. For a respective requesting packet, the MCU can determine a length of a response (e.g., a response packet) of the requesting packet. If the command is a data request, the traffic management logic block determines whether the length of the response is within a threshold. If the length exceeds the threshold, the traffic management logic block paces the command such that the response is within the threshold.

In a variation on this embodiment, the data request can be a remote direct memory access (RDMA) GET command.

In a variation on this embodiment, the MCU can divide the data request into a sequence of sub-requests and include a respective sub-request in a requesting packet. The traffic shaping logic block can then individually manage a respective sub-request.

In a variation on this embodiment, the MCU can generate a packet associated with the command. The NIC can also include a network interface that forwards the packet to a switch fabric.

In a variation on this embodiment, the MCU can be one of a plurality of MCUs residing on the NIC. The traffic management logic block can then arbitrate among the plurality of MCUs to select the MCU for forwarding the command.

In a further variation, the traffic management logic block can pace the command by selecting a second MCU of the plurality of MCUs for forwarding a second command and selecting the MCU for forwarding the command in response to the length of the response of the command falling within the threshold.

In a further variation, the NIC can also include a plurality of flow queues. A respective flow queue can correspond to a unique flow in the NIC. Furthermore, a respective flow queue can be assigned to an MCU of the plurality of MCUs.

In a variation on this embodiment, the threshold can correspond to a rate at which the NIC is capable of processing responses. In this way, the NIC can issue commands at a rate that matches the rate at which the NIC is capable of processing the responses.

Figure 1:
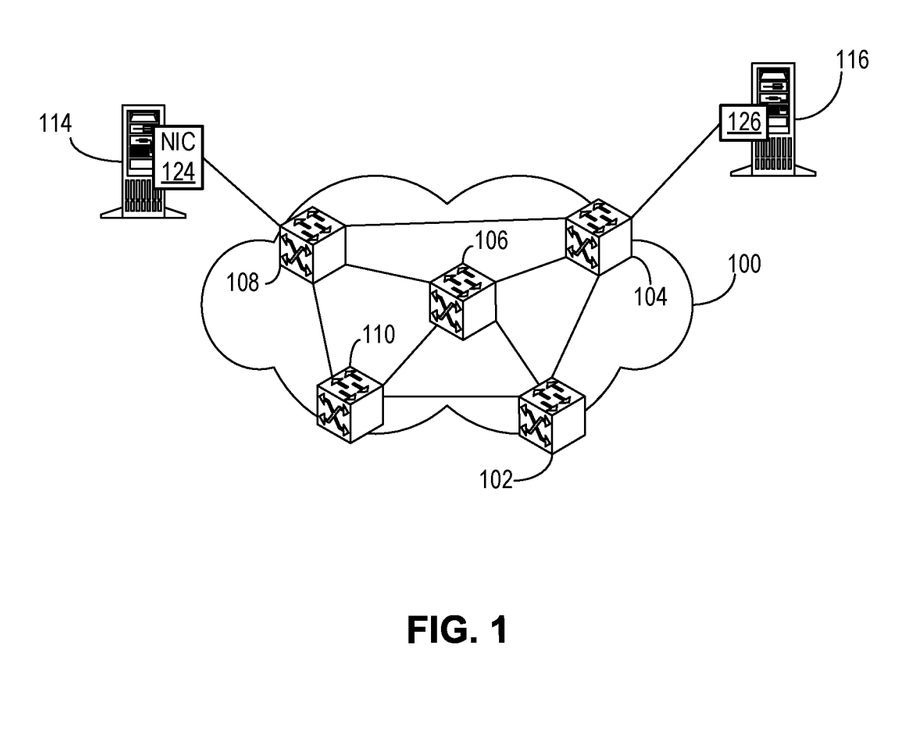
FIG. 1 shows an exemplary network.
Figure 2A:
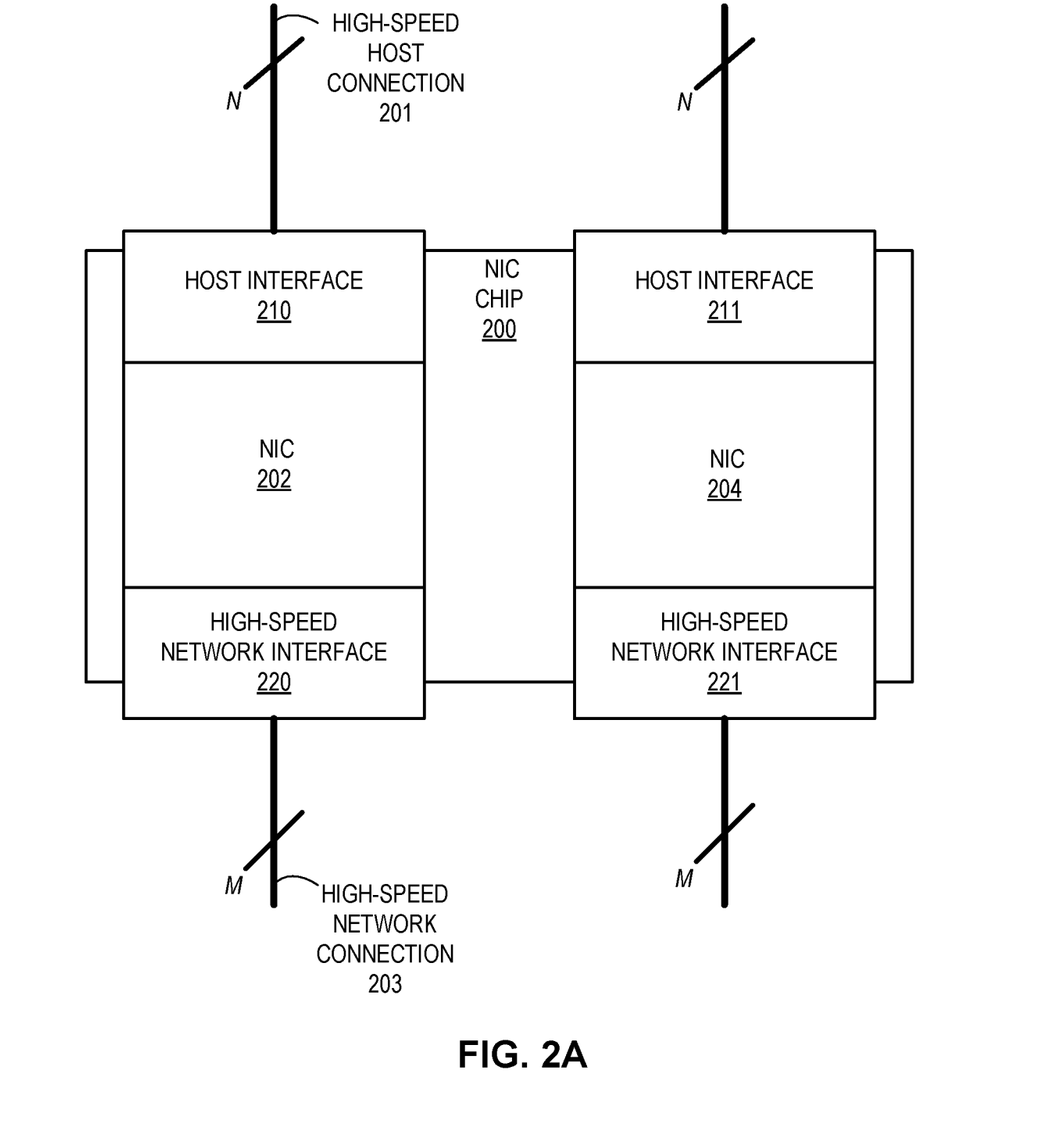
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient data request management.

In this disclosure, packet streams can also be referred to as "packet flows," or simply "flows." The data path traversed by a flow, together with its configuration information maintained by switches, can be referred to as a "flow channel." Furthermore, the terms "buffer" and "queue" are used interchangeably in this disclosure.

FIG. 1 shows an exemplary network that facilitates flow channels. In this example, a network 100 of switches, which can also be referred to as a "switch fabric," can include switches 102, 104, 106, 108, and 110. Host devices 114 and 116 can be equipped with NICs 124 and 126, respectively. If host device 114 issues a command and host device 116 is the target of the command, NICs 124 and 126 can be referred to as the source and target NICs, respectively.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
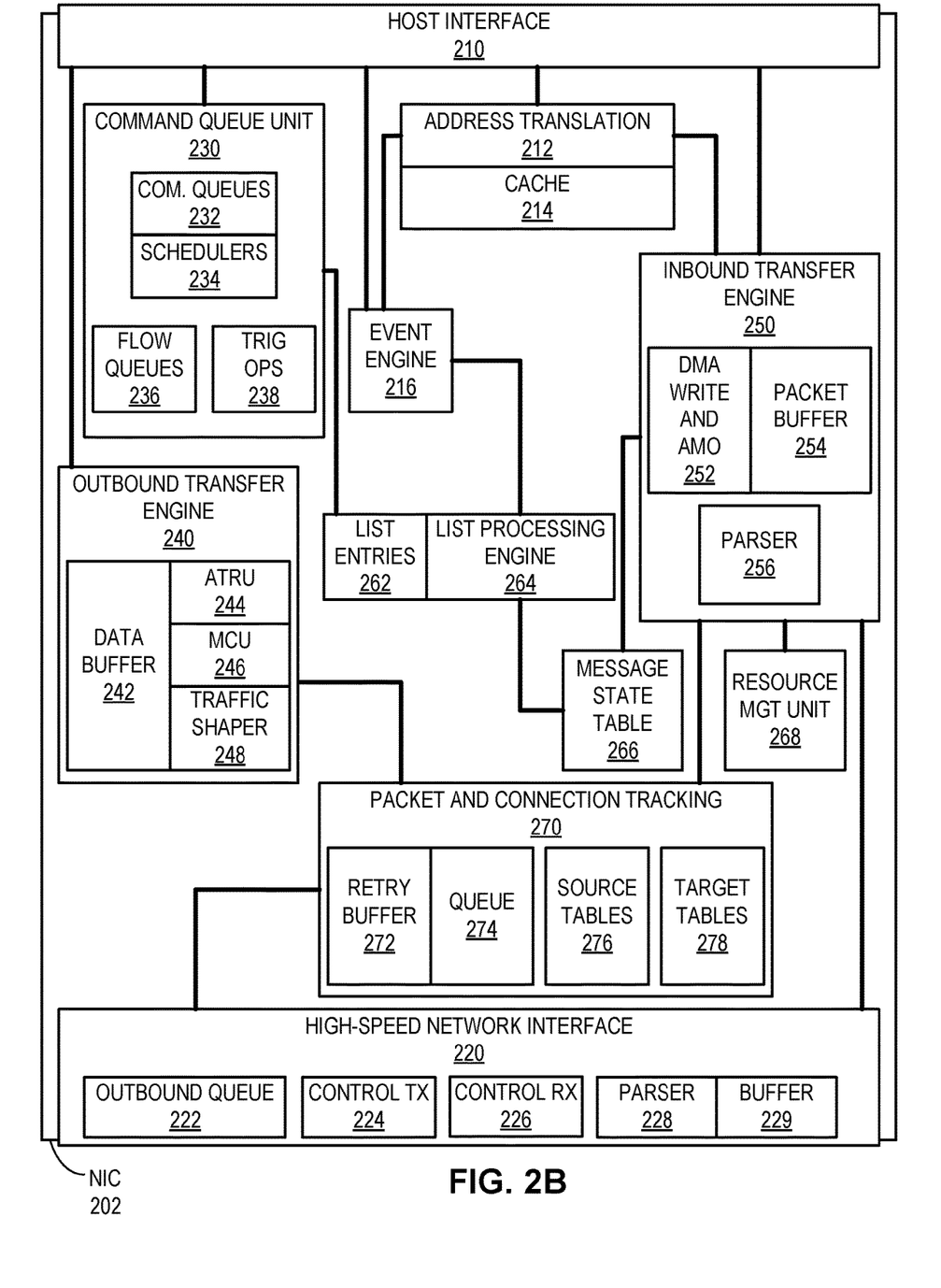
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Request Management in NIC

Figure 3:
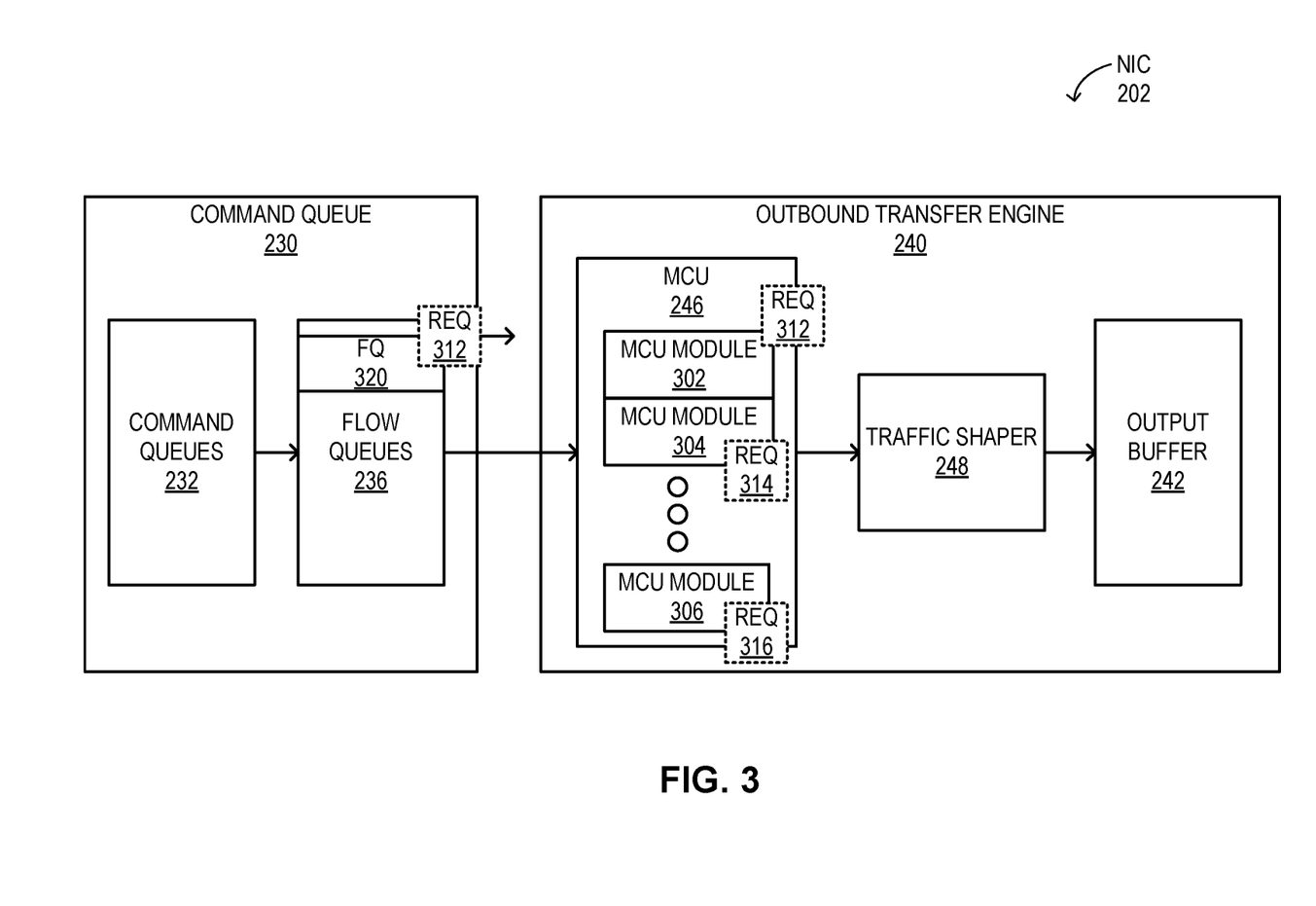
FIG. 3 shows exemplary efficient data request management in a NIC.

FIG. 3 shows exemplary efficient data request management in a NIC. If the host process generates a data request, such as a GET command, the process can write the request in one of the command queues 232. The process can notify NIC 202 regarding the insertion by updating a write pointer of command queue 232. NIC 202 can fetch the request and initiate forwarding the request. However, NIC 202 may process and forward requests at a rate that is higher than the rate at which corresponding responses are returned. For example, the request may require 1 clock cycle of NIC 202 to issue but the response message may require 50 clock cycles of NIC 202 to obtain the requested data. Consequently, there may be a 1:50 disparity in the sizes and processing time between the request and the corresponding response. If NIC 202 continues to issue a request in every clock cycle, when the responses come back, due to their significantly larger size, there can be congestion.

To solve this problem, OXE 240 can inspect a respective command, such as request 312, obtained from command queues 232 to determine whether request 312 is a data request. In some embodiments, OXE 240 can perform a deep packet inspection (e.g., by inspecting the inner headers within the payload of request 312) to determine the command type of request 312. NIC 202 may also determine the type based on MPI matching. Upon determining that request 312 is a data request, OXE 240 can determine the size of the corresponding response based on the quantity of data requested by request 312. OXE 240 can then determine the potential incoming data rate that can be generated by the response. Subsequently, OXE 240 can determine whether the potential incoming data rate is within a threshold. In some embodiments, the threshold can be set based on the rate at which NIC 202 can absorb or process the responses.

Request 312 can be allocated to a flow queue 320 of flow queues 236 based on a flow associated with request 312. OXE 240 can obtain request 312 from flow queue 320 and provide request 312 to an MCU module 302 (e.g., in MCU 246) that has been assigned to flow queue 320. Similarly, OXE 240 can obtain requests 314 and 316 from respective flow queues and provide the requests 312 to MCU modules 304 and 306, respectively. It should be noted that MCU 246 can include a number of MCU modules, each of which can correspond to a flow queue in flow queues 236.

MCU module 302 can maintain an OrdPktActive count of outstanding packets, such as a packet associated with request 312. MCU module 302 can increment OrdPktActive count when a packet is constructed for a message and decrement the count when MCU module 302 observes a response being processed by PCT 270. MCU module 302 can stall the generation of request packets when the OrdPktActive count exceeds a threshold value defined in a register. The threshold value can indicate the appropriate limit. Since throttling the rate of requests relies on expected response length of a respective request, MCU module 302 can determine a RspPktLen value, which indicates the response packet length, for request 312. MCU module 302 can calculate RspPktLen based on the payload of request 312 (e.g., the amount of data requested).

In some embodiments, traffic shaper 248 can determine from which MCU module in MCU 246 to take the next packet to send. Traffic shaper 248 can select an MCU module based on the priority flow control from the link partner, bandwidth sharing between different traffic shaping classes, and bandwidth sharing between MCU modules within a class. By arbitrating among the MCU modules, traffic shaper 248 can throttle (or pace) request packets to match the expected rate of corresponding responses. In this way, traffic shaper 248 can manage the outbound and inbound bandwidth utilized by the applications running on the host. Since an application can perform bulk data transfer using a combination of data transfer (e.g., a PUT command) and data requests (e.g., a GET command), traffic shaper 248 can categorize PUT requests and GET responses as consuming bandwidth for outbound packets and can assign the sum of these to a bandwidth policy.

In this example, traffic shaper 248 can obtain respective OrdPktActive and RspPktLen of requests 312, 314, and 316 from MCU modules 302, 304, and 306, respectively. Traffic shaper 248 may determine that the response for request 312 is within the threshold. Accordingly, traffic shaper 248 can select MCU module 302 based on the arbitration, obtain request 312, and place request 312 in output buffer 242 for forwarding. However, traffic shaper 248 may determine that the response for request 314 can exceed the threshold. Accordingly, traffic shaper 248 can skip MCU module 304 based on the arbitration, thereby refraining from selecting MCU module 304 for forwarding.

Subsequently, traffic shaper 248 may determine that the response for request 316 is within the threshold. Traffic shaper 248 can then select MCU module 306 based on the arbitration, obtain request 316, and place request 316 in output buffer 242. Traffic shaper 248 may select MCU module 304 for forwarding request 314 when the length of the response for request 314 falls within the threshold based on the arbitration process. In this way, MCU modules 302, 304, and 306 can process the requests, such as GET commands, and traffic shaper 248 paces MCU modules 302, 304, and 306 arbitrating among them. Since MCU modules provide the requests, by pacing the MCU modules, traffic shaper 248 can pace the requests.

Figure 4A:
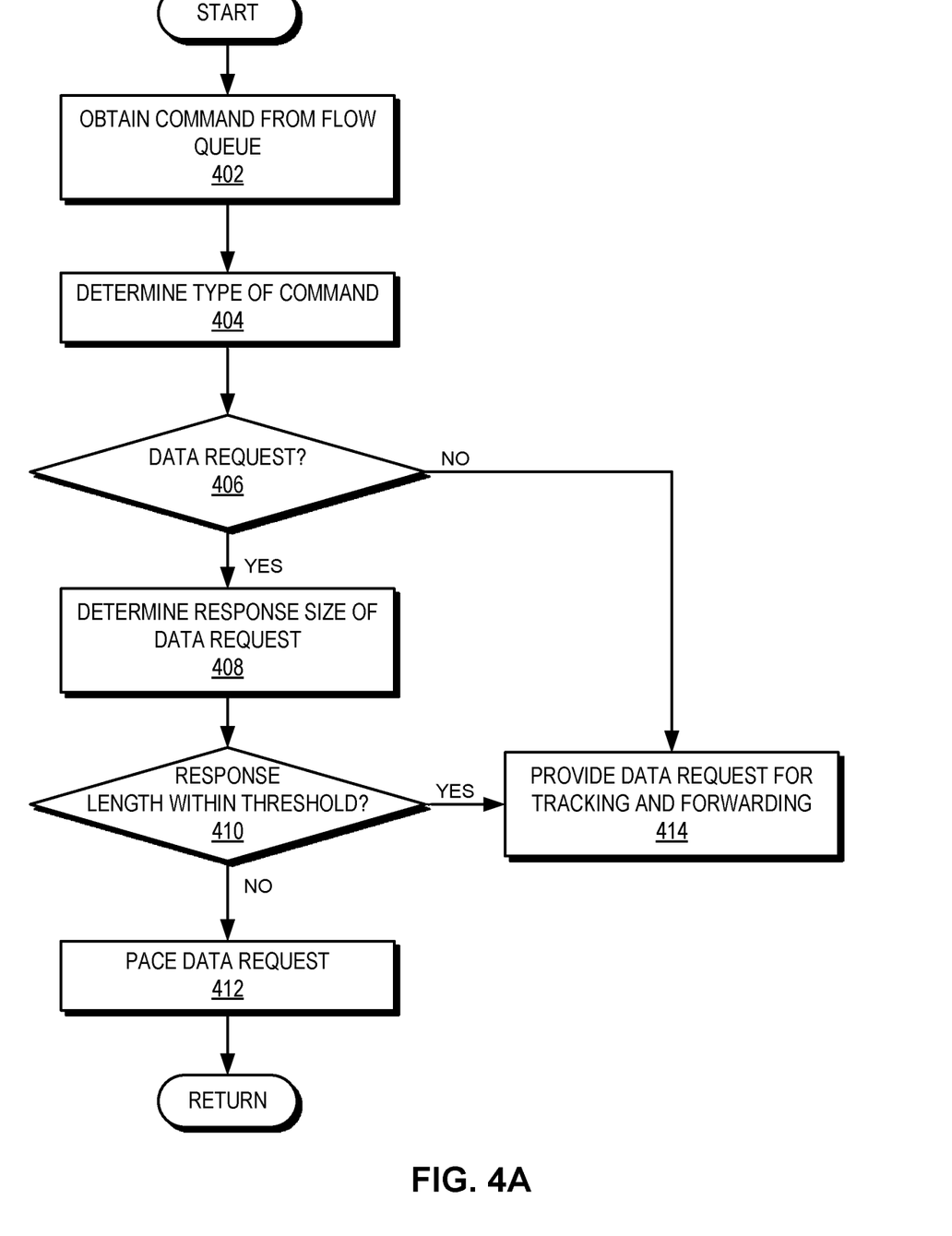
FIG. 4A shows a flow chart of an exemplary data request throttling process in a NIC.

FIG. 4A shows a flow chart of an exemplary data request throttling process in a NIC. During operation, an OXE of the NIC can obtain a command from a flow queue (operation 402). The OXE can then determine the type of the command (operation 404) and check whether the command is a data request (e.g. GET command) operation 406). Subsequently, the OXE can determine a response size of the data request (operation 408) and determine whether a response length of the data request is within a threshold (operation 410). In some embodiments, an MCU module in the OXE can calculate RspPktLen for the command and provide RspPktLen to a packet shaper, which, in turn, can determine whether the response length is within a threshold. If the response length is within the threshold, the OXE can pace the data request (e.g., by throttling the transmission rate of data requests) (operation 412). On the other hand, if the response length is within the threshold, the OXE can provide the data request for tracking and forwarding (operation 414).

Figure 4B:
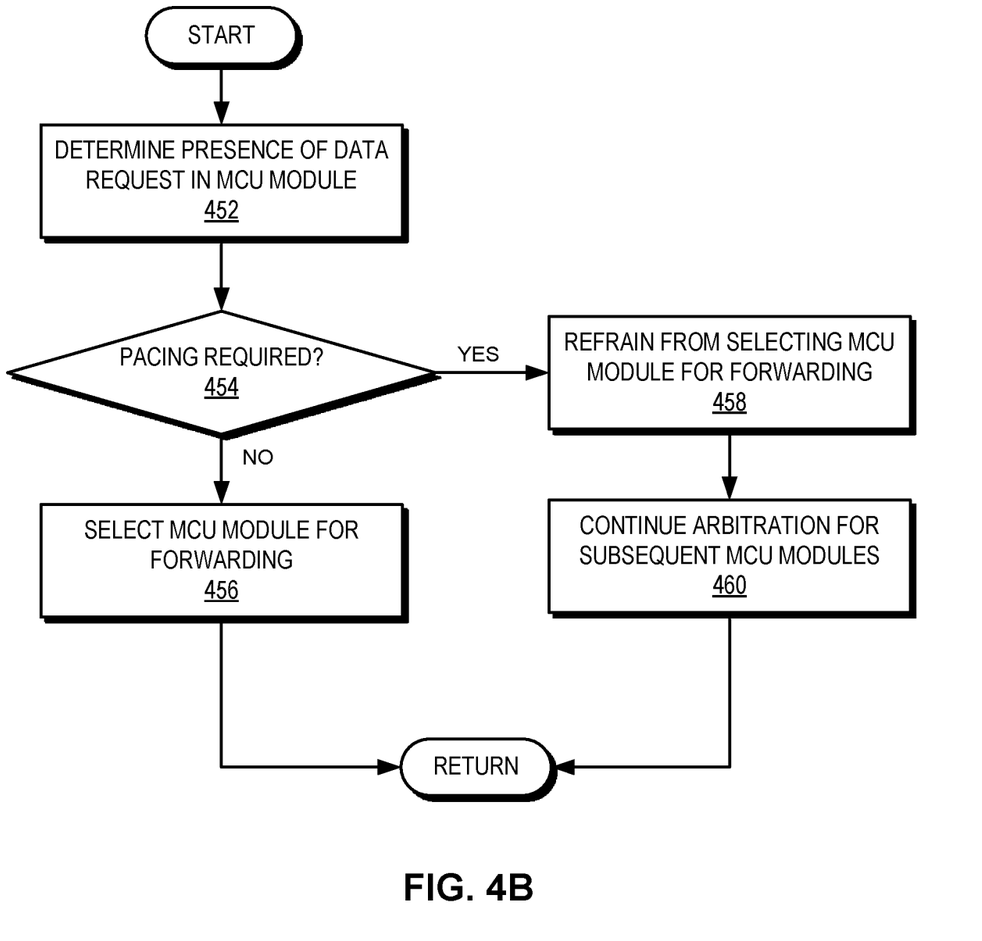
FIG. 4B shows a flow chart of an exemplary arbitration process for facilitating data request throttling in a NIC.

FIG. 4B shows a flow chart of an exemplary arbitration process for facilitating data request throttling in a NIC. During operation, a traffic shaper of the NIC determines the presence of a data request in an MCU module (operation 452). In some embodiments, the MCU module can provide information, such as RspPktLen, associated with the data request to the traffic shaper, thereby notifying the traffic shaper regarding the presence of the data request. The traffic shaper can then determine whether pacing is required for the data request based on the response length (operation 454). If pacing is not required, the traffic shaper can select the MCU module for forwarding (operation 456). However, if pacing is required for the data request, the traffic shaper can refrain from selecting the MCU module for forwarding (operation 458) and continue arbitration for subsequent MCU modules (operation 460). A subsequent MCU module can be selected based on an arbitration policy of the NIC. Examples of an arbitration policy include, but are not limited to, round robin selection, load-based selection, priority-based selection, and availability-based selection.

Exemplary Computing Device

Figure 5:
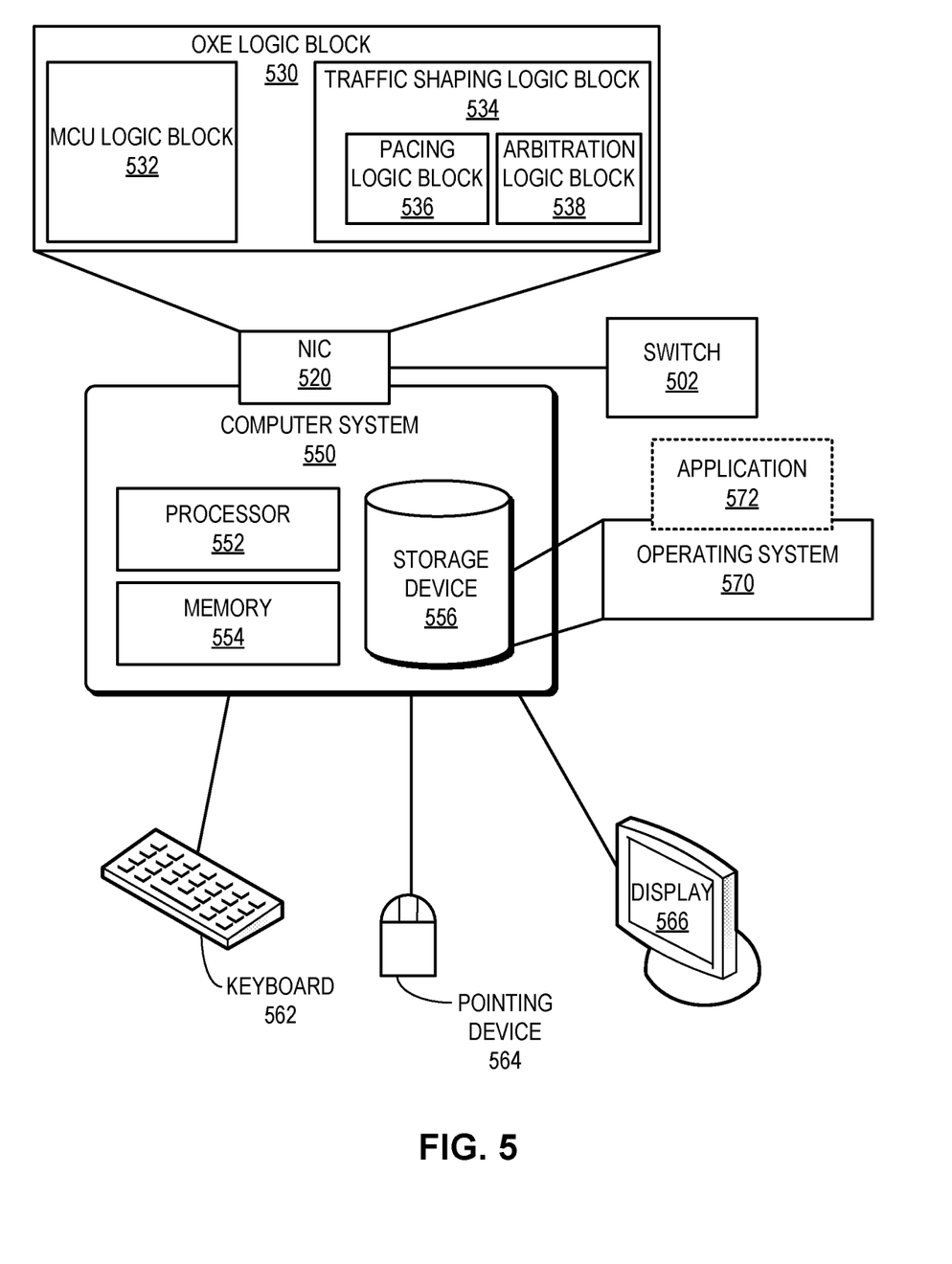
FIG. 5 shows an exemplary computer system equipped with a NIC that facilitates efficient data request management.

FIG. 5 shows an exemplary computer system equipped with a NIC that facilitates efficient data request management. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an OXE logic block 530, as described in conjunction with FIG. 2B. OXE logic block 530 can include an MCU logic block 532 that can obtain a command, such as a GET or a PUT command. The command can be issued by application 572 via the host interface. MCU logic block 532 can determine a type of the command and a length of a response of the command. MCU logic block 532 can provide these pieces of information to a traffic shaping logic block 534 of OXE logic block 530. Traffic shaping logic block 534 can further include a pacing logic block 536 and an arbitration logic block 538. Pacing logic block 536 can determine whether the command requires pacing based on the type of the command and the length of the response of the command. Arbitration logic block 538 can arbitrate among a set of MCUs of MCU logic block 532. If the command requires pacing, arbitration logic block 538 may refrain from selecting the corresponding MCU, thereby pacing the data requests in NIC 520.

In summary, the present disclosure describes a NIC that facilitates efficient data request management. The NIC can reside in a computer system that can also include a processor, a memory device, and a host interface configured to couple the NIC. The NIC can be equipped with a command queue, an MCU, and a traffic management logic block. During operation, the command queue stores a command issued via the host interface. The MCU can then determine a type of the command and a length of a response of the command. If the command is a data request, the traffic management logic block determines whether the length of the response is within a threshold. If the length exceeding the threshold, the traffic management logic block paces the command such that the response is within the threshold.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC) chip that allows a host computer to communicate with a network, the NIC chip comprising:
   a command queue to store a command issued via a host interface, the command queue comprising two independent sets of queues for initiator commands including a first queue for PUT commands and a second queue for GET commands;
   a message chopping unit (MCU) to determine a type of the command and a Response Packet Length (RspPktLen) length of a response of the command;
   a traffic shaping logic block to:
      in response to the command being a data request, determine that the RspPktLen length of the response is exceeding a threshold, and
      increment an Outstanding Packets Active (OrdPktActive) count in response to the command being constructed, decrement the OrdPktActive count in response to the response being processed, and stall, by an outbound transfer engine of the NIC chip, a generation of the command in response to the RspPktLen length exceeding the threshold; and
   a traffic shaper of the outbound transfer engine to:
      in response to determining the OrdPktActive count and the RspPktLen length, determine that the response for the command being the data request is within the threshold; and
      select an output buffer for forwarding.

2. The NIC chip of claim 1, wherein the MCU is further to:
   divide the data request into a sequence of sub-requests;
   include a respective sub-request in a requesting packet; and
   wherein the traffic shaping logic block is further to individually manage a respective sub-request.

3. The NIC chip of claim 1, wherein the MCU is further to generate a packet associated with the command; and
   wherein the NIC chip further comprises a network interface to forward the packet to a switch fabric.

4. The NIC chip of claim 1, wherein the MCU is one of a plurality of MCUs residing on the NIC chip; and
   wherein the traffic shaping logic block is further to arbitrate among the plurality of MCUs to select the MCU for forwarding the command.

5. The NIC chip of claim 4, wherein the traffic shaping logic block is to pace the command by:
   selecting a second MCU of the plurality of MCUs for forwarding a second command; and
   selecting the MCU for forwarding the command in response to the RspPktLen length of the response of the command falling within the threshold.

6. The NIC chip of claim 4, wherein the NIC chip further comprises:
   a plurality of flow queues, wherein a respective flow queue corresponds to a unique flow in the NIC chip, and wherein a respective flow queue is assigned to an MCU of the plurality of MCUs.

7. The NIC chip of claim 1, wherein the threshold corresponds to a rate at which the NIC chip is capable of processing responses, thereby issuing commands at a rate that matches the rate at which the NIC chip is capable of processing responses.

8. The NIC chip of claim 1, further comprising:
   a request management system to:
      updating a write pointer that notifies the NIC chip regarding the command stored at the command queue.

9. The NIC chip of claim 1, wherein the command queue comprises a first set of queues for initiator commands and a second set of queues for target commands.

10. The NIC chip of claim 1, wherein pacing the command by the NIC chip issues commands at a rate within the threshold.

11. The NIC chip of claim 1, wherein the command queue to receive a second command, wherein the MCU is one of a plurality of MCUs residing on the NIC chip, and the NIC chip further comprising:
   a traffic management logic block to:
      select a second MCU of the plurality of MCUs; and
      forward the second command to the second MCU causing pacing of the second command.

12. A method, comprising:
   storing, in a command queue of a network interface controller (NIC) chip that allows a host device to communicate with a network, a command issued via a host interface of the host device that couples the NIC chip to the host device, the command queue comprising two independent sets of queues for initiator commands including a first queue for PUT commands and a second queue for GET commands;

determining, by the NIC chip, a type of the command and a Response Packet Length (RspPktLen) length of a response of the command;

in response to the command being a data request, determining that the RspPktLen length of the response is exceeding a threshold;

incrementing an Outstanding Packets Active (OrdPktActive) count in response to the command being constructed, decrement the OrdPktActive count in response to the response being processed, and stalling, by an outbound transfer engine of the NIC chip, a generation of the command in response to the RspPktLen length exceeding the threshold in response to determining the OrdPktActive count and the RspPktLen length, determining that the response for the command being the data request is within the threshold; and selecting an output buffer for forwarding.

13. The method of claim 12, further comprising:
dividing the data request into a sequence of sub-requests;
including a respective sub-request in a requesting packet; and
individually managing a respective sub-request.

14. The method of claim 12, further comprising:
generating a packet associated with the command; and
forwarding the packet to a switch fabric.

15. The method of claim 12, wherein the NIC chip comprises a plurality of message chopping units (MCUs); and
wherein the method further comprises arbitrating among the plurality of MCUs to select an MCU for forwarding the command.

16. The method of claim 15, wherein pacing the command further comprises:
selecting a second MCU of the plurality of MCUs for forwarding a second command; and
selecting the MCU for forwarding the command in response to the RspPktLen length of the response of the command falling within the threshold.

17. The method of claim 15, wherein the NIC chip further comprises:
a plurality of flow queues, wherein a respective flow queue corresponds to a unique flow in the NIC chip, and wherein a respective flow queue is assigned to an MCU of the plurality of MCUs.

18. The method of claim 12, wherein the threshold corresponds to a rate at which the NIC chip is capable of processing responses, thereby issuing commands at a rate that matches the rate at which the NIC chip is capable of processing responses.

19. The method of claim 12, wherein the RspPktLen length is calculated based on a payload of the command.

20. The method of claim 12, further comprising:
providing, to a traffic shaper of the outbound transfer engine of the NIC chip, the RspPktLen length to notify the traffic shaper of presence of the data request.

21. A computer system, comprising:
a processor;
a network interface controller (NIC) chip; and
a host interface to couple the NIC chip;
wherein the NIC chip comprises:
a command queue to store a command issued via the host interface, the command queue comprising two independent sets of queues for initiator commands including a first queue for PUT commands and a second queue for GET commands;
a message chopping unit (MCU) to determine a type of the command and a Response Packet Length (RspPktLen) length of a response of the command;
a traffic shaping logic block to:
in response to the command being a data request, determine that the RspPktLen length of the response is exceeding a threshold, and
increment an Outstanding Packets Active (OrdPktActive) count in response to the command being constructed, decrement the OrdPktActive count in response to the response being processed, and stalling, by an outbound transfer engine of the NIC chip, a generation of the command in response to the RspPktLen length exceeding the threshold; and
a traffic shaper of the outbound transfer engine to:
in response to determining the OrdPktActive count and the RspPktLen length, determine that the response for the command being the data request is within the threshold; and
select an output buffer for forwarding.

22. The computer system of claim 21, wherein the MCU is further to:
divide the data request into a sequence of sub-requests; and
include a respective sub-request in a requesting packet; and
wherein the traffic shaping logic block is further to individually manage a respective sub-request.

23. The computer system of claim 21, wherein the MCU is one of a plurality of MCUs residing on the NIC chip; and
wherein the traffic shaping logic block is further to arbitrate among the plurality of MCUs to select the MCU for forwarding the command.

24. The computer system of claim 23, wherein the traffic shaping logic block is to pace the command by:
selecting a second MCU of the plurality of MCUs for forwarding a second command; and
selecting the MCU for forwarding the command in response to the RspPktLen length of the response of the command falling within the threshold.

25. The computer system of claim 21, wherein the threshold is defined in a register of the NIC chip.

* * * * *